(12) United States Patent
Banatwala et al.

(10) Patent No.: US 7,475,406 B2
(45) Date of Patent: Jan. 6, 2009

(54) EVENT NOTIFICATION STRUCTURE FOR DYNAMICALLY AGGREGATED LOGICAL COMPONENTS

(75) Inventors: Mustansir Banatwala, Hudson, NH (US); Sergei R. Landar, Cambridge, MA (US); Sami M. Shalabi, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 10/734,966

(22) Filed: Dec. 15, 2003

(65) Prior Publication Data

US 2005/0144269 A1    Jun. 30, 2005

(51) Int. Cl.
G06F 3/00       (2006.01)
G06F 9/44       (2006.01)
G06F 9/46       (2006.01)
G06F 13/00      (2006.01)

(52) U.S. Cl. .................................................... 719/318
(58) Field of Classification Search .................. 719/318
See application file for complete search history.

(56) References Cited

U.S. PATENT DOCUMENTS

| | | | | |
|---|---|---|---|---|
| 5,881,315 | A * | 3/1999 | Cohen | 710/52 |
| 6,269,396 | B1 * | 7/2001 | Shah et al. | 709/223 |
| 6,314,533 | B1 * | 11/2001 | Novik et al. | 714/39 |
| 6,732,363 | B1 * | 5/2004 | Chaudhry et al. | 719/318 |
| 6,877,163 | B1 * | 4/2005 | Jones et al. | 719/332 |
| 7,331,049 | B1 * | 2/2008 | Jin | 719/314 |
| 7,331,050 | B2 * | 2/2008 | Vuppula | 719/318 |
| 7,349,945 | B1 * | 3/2008 | Whipple | 709/206 |
| 7,398,530 | B1 * | 7/2008 | Parla et al. | 719/318 |
| 2003/0191559 | A1 * | 10/2003 | Chatsinchai et al. | 700/245 |
| 2004/0150670 | A1 * | 8/2004 | Feldman et al. | 345/781 |
| 2005/0015472 | A1 * | 1/2005 | Catania et al. | 709/223 |

OTHER PUBLICATIONS

Harrison, T. H., Levine, D. L., and Schmidt, D. C., "The design and performance of a real-time CORBA event service", 1997, ACM Press, Proceedings of the 12th ACM SIGPLAN Conference on Object-Oriented Programming, Systems, Languages, and Applications, A. M. Berman, Ed. OOPSLA '97, pp. 184-200.*

Gore, P., Cytron, R., Schmidt, D., and O'Ryan, C. "Designing and Optimizing a Scalable CORBA Notification Service", 2001, ACM Press, Proceedings of the ACM SIGPLAN Workshop on Languages, Compilers and Tools For Embedded Systems, LCTES '01, pp. 196-204.*

* cited by examiner

*Primary Examiner*—Meng-Ai An
*Assistant Examiner*—KimbleAnn Verdi
(74) *Attorney, Agent, or Firm*—Stephen Keohane, Esq.; Steven M. Greenberg, Esq.; Carey Rodriguez Greenberg & Paul LLP

(57) ABSTRACT

The present invention is a method, system and apparatus for event notification framework in a system of dynamically aggregated logical components. In accordance with the present invention, an event notification and management system can include one or more logical components coupled to corresponding dynamic proxies. An event notification service can be communicatively linked to one or more subscribing processes. Finally, an event queue can be disposed between the dynamic proxies and the event notification service.

5 Claims, 3 Drawing Sheets

EVENT NOTIFICATION STRUCTURE FOR DYNAMICALLY AGGREGATED LOGICAL COMPONENTS

BACKGROUND OF THE INVENTION

1. Statement of the Technical Field

The present invention relates to the field of interprocess communications and more particularly to an event notification structure in a system of dynamically aggregated logical components.

2. Description of the Related Art

Interprocess communications involves the exchange of messages between different logical processes, whether the processes reside within the same or different process address spaces. For as long as computing devices have been able to communicate electronically over a data communications network, processes operating within the different devices have exchanged data using known techniques in interprocess communications. Over time, interprocess communications have evolved from direct point-to-point linkages, to connection-oriented and connectionless Internet protocol based communications, to higher level exchanges of events and messages.

Prior to the advancement of interprocess communications technologies, most computing processes remained self-contained, operating exclusively based upon data available within the process address space and according to the detectable state of the computing process. As interprocess communications technologies have advanced, however, independently operating computing processes have demonstrated a willingness to rely both upon data which can be accessed within other computing processes, and also according to the state of other applications which can be detected across address space boundaries. Indeed, many computing processes have been developed to intercede in the operation of other independent computing processes through the trapping of event messages in the independent computing processes.

Conventionally, the methodologies available for detecting and interceding in an event handling process of a computing process remain limited to the cooperative hard-coding of event publishing logic within the computing process, and the sub-classing of an event-handler within the computing process to re-route process events to an alternative event handler. Both methodologies require substantial pre-configuration on the part of the software developer and both methodologies can be limited to static configurations specified well in advance of the deployment of the computing processes. In many circumstances known in the art, however, a static configuration of one or more computing processes for event notification and management simply cannot suffice.

Specifically, recent trends in on-demand computing have given rise to the dynamic aggregation of computing processes to produce a highly personalized, composite application. Consistent with this dynamic aggregation, customized applications having varying constituent logical components can be constructed dynamically according to a templated arrangement limited only by the identity of the end user to the extent that user based authentication has been incorporated as part of the application aggregation framework. Given the fluid and unpredictable nature of the dynamic aggregation process, however, different computing processes within an aggregation often cannot have enough of an awareness of one another to permit event notification and management. Moreover, as it can be difficult to account for all possible aggregations in a dynamic aggregation process, pre-configuring any one of the computing processes within the aggregation for event notification sharing can be challenging if not impossible.

SUMMARY OF THE INVENTION

The present invention addresses the deficiencies of the art in respect to event notification and management and provides a novel and non-obvious method, system and apparatus for event notification for dynamically aggregated logical components. In accordance with the present invention, an event notification and management system can include one or more logical components coupled to corresponding dynamic proxies. An event notification service can be communicatively linked to one or more subscribing processes. Finally, an event queue can be disposed between the dynamic proxies and the event notification service.

The dynamic proxy can be a dynamic proxy configured for interoperation with a component instance in a dynamic aggregation of components. Specifically, the dynamic proxy can include a list of selected listener method calls in the component instance. the dynamic proxy further can include a communicative coupling to an event queue. Finally, the dynamic proxy can include event notification logic coupled to the list and configured to post events to the event queue which relate to invoked listener method calls included in the list. Importantly, the dynamic proxy also can include event management logic configured to selectively handle invoked listener method calls.

The dynamic proxy when disposed within the system of the present invention can be configured for event notification and management. In accordance with the inventive arrangements, an event notification and management method can include creating a component instance from an amalgamation of a dynamic proxy object definition and a component interface. Selected calls to methods disposed within the component instance can be trapped and a reference to the trapped selected calls can be routed to an event queue. Subsequently, for each reference in the queue, a notification can be distributed to a set of subscribers registered to receive notifications for the reference.

Notably, the creating step can include the step of instructing a factory object coupled to the dynamic proxy object definition to create the component instance. Moreover, once the component instance has been created and once selected calls have been trapped in the dynamic proxy, it can be determined whether an event notification service responsible for distributing the notifications has been activated. Consequently, the routing step can be performed only if the event notification service has been activated. In a preferred aspect of the invention, the routing step can include consulting an event list enumerating specific ones of the calls. As a result, only specific ones of the calls which have been included in the event list can be posted to the event queue.

Importantly, the method of the invention can include the step of selectively performing an action based upon the trapping of a call. The actions can include quashing the trapped selected calls, or handling the trapped selected calls without passing the trapped selected calls to the component instance. The actions also can include assisting the component instance in handling the trapped selected calls while passing the trapped selected calls to the component instance. Finally, the actions can include modifying the trapped selected calls before passing the trapped selected calls to the component instance.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is system, method and apparatus for an event notification framework for dynamically aggregated logical components. In accordance with the present invention, logical components in an aggregation can be configured at the time of creation with respective instances of a dynamic proxy. Each dynamic proxy can trap events of interest in a coupled logical component. Once trapped, the events of interest can be posted to an event broker which can publish the events to registered subscribers. Preferably, in addition to providing event notification, the dynamic proxy can manage the event notification which management can range from quashing the event to fully handling the event. In all cases, a list of events published and managed through the dynamic proxy can be defined by the registered subscribers in order to limit resource consumption in the event notification framework.

Figure 1:
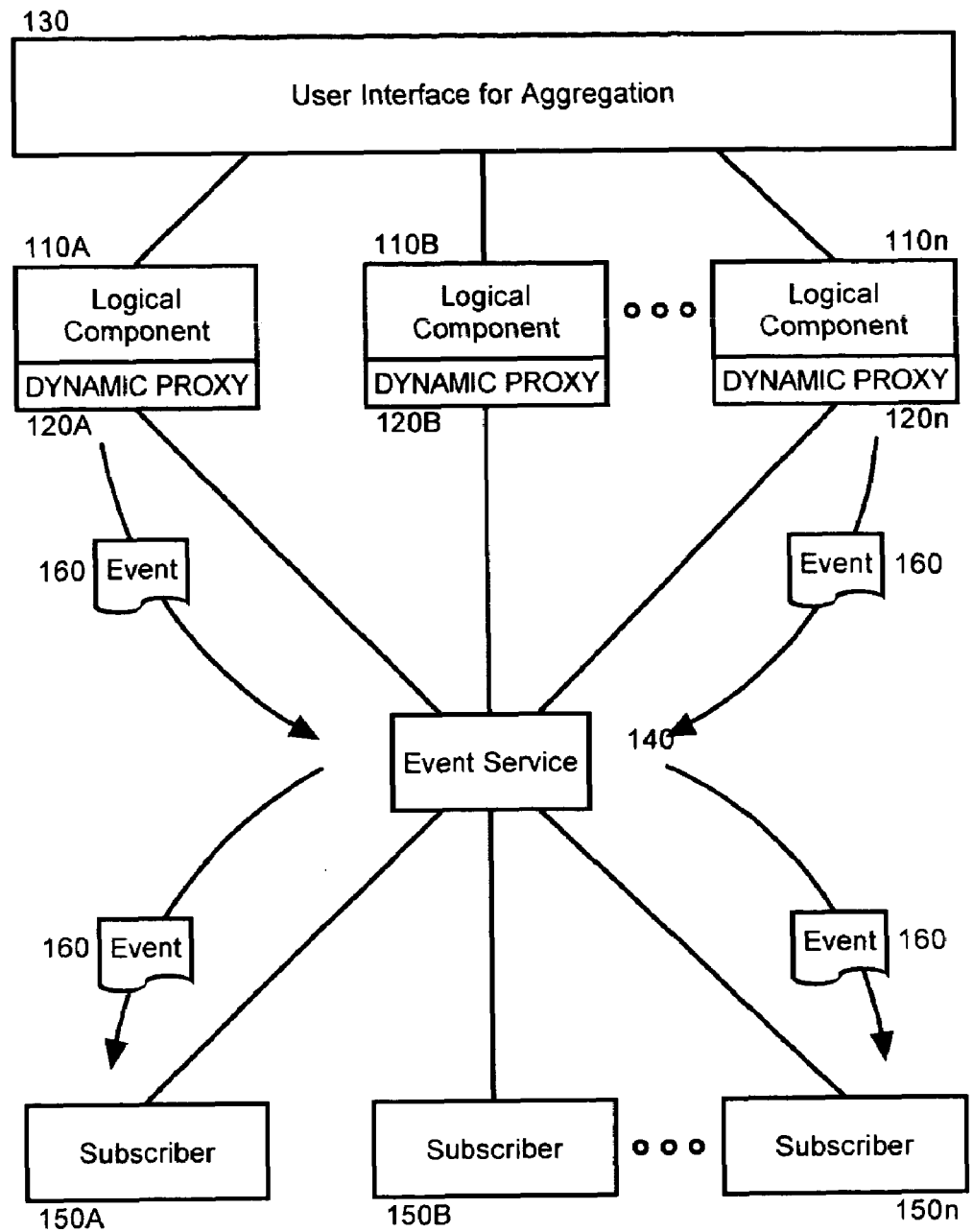
FIG. 1 is block diagram illustrating a method, system and apparatus for event notification for dynamically aggregated logical components.

FIG. 1 is block diagram illustrating a method, system and apparatus for event notification for dynamically aggregated logical components. In accordance with the present invention, a multiplicity of logical components 110A, 110B, 110n can be aggregated into a composite view 130. In this regard, the logical components 110A, 110B, 110n can include independently executing computing logic residing in the same or different process address spaces. In a preferred aspect of the invention, the logical components 110A, 110B, 110n can be server deployed network distributable computing components, such as servlets which can be rendered in a portlet user interface. Accordingly, in the preferred aspect of the invention, the composite view 130 can be a portal view within a portal environment.

Importantly, each of the logical components 110A, 110B, and 110n can be created to include respective dynamic proxy logic 120A, 120B, and 120n. The dynamic proxy logic 120A, 120B, 120n can be programmed to intercept method call events 160 within the respective logical components 110A, 110B, 110n. Once intercepted, the events 160 can be selectively forwarded to an event service 140 performing the role of an event broker/manager. For each event 160 processed in the event service 140, the event service 140 can identify subscribers 150A, 150B, 150n which have subscribed to the event 160. Subsequently, the event service 140 can forward the event 160 to the subscribers 150A, 150B, 150n.

Notably, aside from publishing events 160 to the event service 130, the dynamic proxy logic 120A, 120B, 120n can further handle the processing of the events 160 either in conjunction with event handling logic disposed within the logical components 110A, 110B, 110n, or alone without the assistance of event handling logic disposed within the logical components 110A, 110B, 110n. Specifically, when detecting an event 160 in the dynamic proxy logic 120A, 120B, 120n, the dynamic proxy logic 120A, 120B, 120n can choose whether to quash the event 160 so as to hide the occurrence of the event 160 from the logical components 110A, 110B, 110n, whether to pre-process the event 160 before passing the event 160 to the logical components 110A, 110B, 110n, or whether to defer processing entirely to the logical components 110A, 110B, 110n. In this way, the system, method and apparatus of the present invention both can perform event notification and event management.

Figure 2:
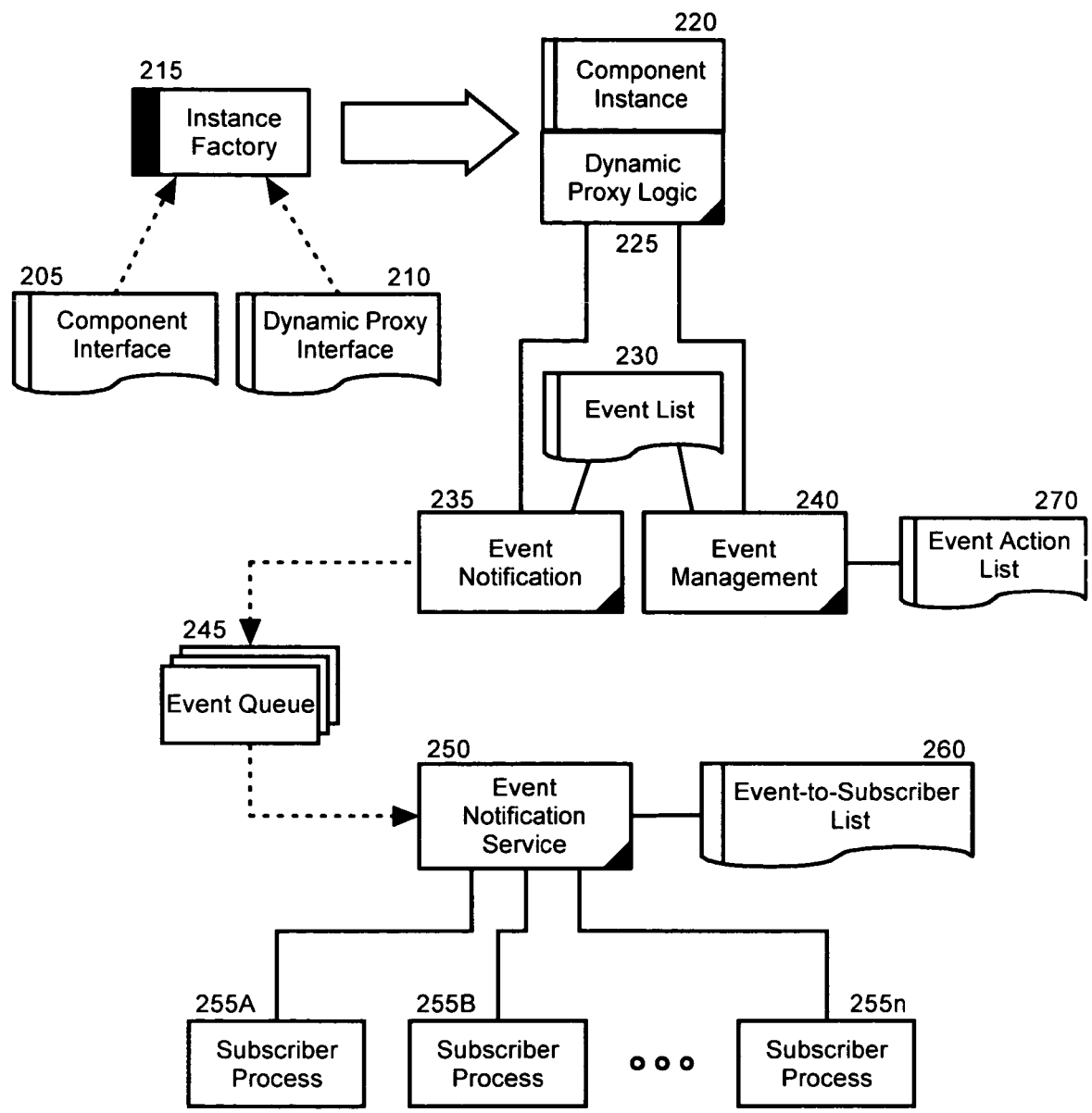
FIG. 2 is a schematic illustration of a system configured for event notification and management for a component in a dynamic aggregation of logical components; and, FIG. 3 is a flow chart illustrating a process for managing an event notification received in the dynamic proxy of FIG. 2.

In a preferred aspect of the invention, a system for event notification and management can be arranged to perform event notification and management for a collection of logical components aggregated in a composite application. To that end, FIG. 2 is a schematic illustration of a system configured for event notification and management for a component in a dynamic aggregation of logical components. The system can include an instance factory 215 programmed to produce a component instance 220 along with coupled dynamic proxy logic 225 based upon a component interface 205 and a dynamic proxy interface 210. The instance factory 215 for producing dynamic proxy logic in association with a component instance 220 is well known in the art and can include an instance factory such as that described in Mark Davidson, *Using Dynamic Proxies to Generate Event Listeners Dynamically*, Sun Microsystems Articles (Dec. 6, 2003).

The dynamic proxy logic 225 can include method members both for handling event notification 235 and also for handling event management 240. In this regard, an "invoke( )" process defined within an "InvocationHandler" for the dynamic proxy logic 225 can provide the event notification methodology 235 and the event management methodology 240. The event notification methodology 235 can be configured for activation responsive to the calling of a listener method disposed within the component instance 220. In particular, the event notification methodology 235 can be configured for activation prior to permitting the communication of the listener method call to the component instance 220.

The event notification methodology 235 can be communicatively coupled to an event queue 245. The event queue 245 can be configured to store incoming events from the event notification methodology 235 for processing by a coupled event notification service 250. In this regard, within the event notification methodology 235, an event can be formulated which can indicate the occurrence of the listener method call. Subsequently, the event notification methodology 235 can forward formulated events to the event queue 245. In any event, the event queue 245 can be communicatively coupled to the event notification service 250. The event notification service 250 further can be coupled to an event-to-subscriber list 260 which can match specific events to specific registered ones of the subscriber processes 255A, 225B, 255n.

The event notification service 250 can retrieve events from the event queue 245 and can forward the retrieved events to the subscriber processes 255A, 255B, 255n. More particularly, when the event notification service 250 receives an event for processing, the event notification service 250 can consult the event-to-subscriber list 260. In this way, when an event is retrieved from the event queue 245, the event can be forwarded only to those of the subscriber processes 255A, 255B, 255n which have registered to receive notification of the event.

Preferably, the event notification can screen the events passed to the event queue 245 through an event list 230. The event list 230 can specify only those events for which the subscriber processes 255A, 255B, 255n have expressed an interest, for instance through a registration process. Accordingly, the event notification methodology 235 can consult the event list 230 when invoked to determine whether to ignore the event or whether to pass a notification of the event to the event queue 245. Advantageously, the event list 230 can be derived from the event-to-subscriber list 260 to the extent that the subscriber processes 255A, 255B, 255n can specify events for which notifications are to be provided by the event notification service 250.

In addition to providing mere notification of events in the component instance 220, the dynamic proxy logic 225 further can include an event management methodology 240 for selectively handling method calls invoked in the component instance 220. In this regard, the event management methodology 240 can screen intercepted listener method calls in the component instance 220 to identify method calls of interest. The event management methodology 240 can pursue three courses of action: quash the event so that the component instance 220 remains unaware of the attempted listener method call, fully handle the event so that the component instance 220 remains unaware of the attempted listener method call, or pre-process the method call before passing the event back to the component instance 220 for handling. Notably, the actions to be taken responsive to the interception of an event can be specified externally to the event management methodology 240 in an event action list 270.

Figure 3:
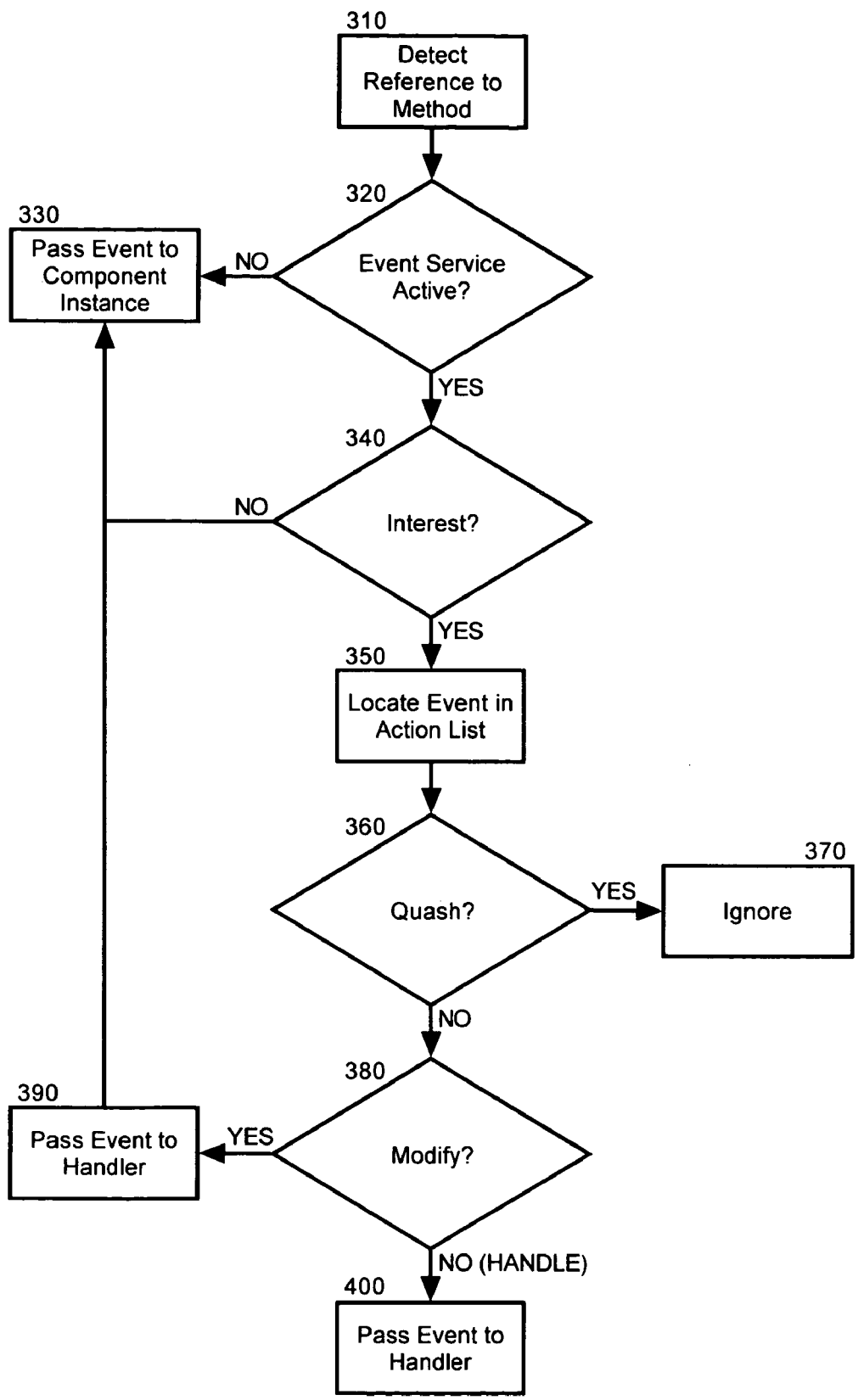

In more particularly illustration of the operation of the event management methodology 240, FIG. 3 is a flow chart illustrating a process for managing an event notification received in the dynamic proxy of FIG. 2. Beginning in block 310, a method call to a listener method in the component instance can be detected and passed to the dynamic proxy. At the outset, in decision block 320 if the event service is not active and operational, the call can be ignored and forwarded on to the component instance in block 330.

Importantly, as it will be recognized by the skilled artisan, the initial testing for event service activation can permit the dynamic activation and operation of the event notification framework of the present invention. Specifically, immediately upon activating the event service, subsequently created component instances will produce events which can be passed to the dynamic proxy. Conversely, once the event service has been deactivated, valuable computing resources required to perform event notification and management need not become wasted. Thus, the logic of FIG. 3 permits a clean integration of the event notification framework with the fluid nature of the dynamic aggregation of component instances, particularly in a portal environment.

In any case, if the event service is determined to have been activated in decision block 320, in decision block 340 it can be determined whether the detected event is an event of interest. If the event is not of interest, in block 330 the event can be passed on to the component instance for further processing. Otherwise, in block 350 the event of interest can be located in a list of event actions. If in decision block 360 the action list specifies a quashing of the event, in block 370 the event both can be ignored by the dynamic proxy, and also the event will not be passed to the component instance for further handling.

In decision block 380, if the event is to be handled in some manner, it can be determined whether the event handling or the event is to be modified prior to its handling in the component instance, or whether the event is to be handled entirely externally to the component instance. In the case of the former, in block 390 the event can first be passed to an event handler which can execute logic, modify the nature of the event itself, or both. Subsequently, the event can be passed to the component instance in block 330. By comparison, in the case of the latter, in block 400 the event can be passed to the event handler and the component instance can remain unaware of the occurrence of the event.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A dynamic proxy stored in memory and executed by a processor configured for interoperation with a component instance in a dynamic aggregation of components, the dynamic proxy comprising:

a list of selected listener method calls in said component instance;

a communicative coupling to an event queue;

event notification logic coupled to said list and configured to post events to said event queue which relate to invoked listener method calls included in said list; and, event management logic configured to selectively handle invoked listener method calls, wherein said event management logic comprises programming for selectively performing one of quashing one of said invoked listener method calls, handling said one of said invoked listener method calls without passing said one of said invoked listener method calls to said component instance, assisting the component instance in handling said one of said invoked listener method calls while passing said one of said invoked listener method calls to said component instance, and modifying said one of said invoked listener method calls before passing said one of said invoked listener method calls to said component instance.

2. An event notification and management method comprising the steps of:

creating a component instance from an amalgamation of a dynamic proxy object definition and a component interface;

trapping selected calls to methods disposed within said component instance;

routing a reference to said trapped selected calls to an event queue;

for each reference in said event queue, distributing a notification to a set of subscribers registered to receive notifications for said reference; and, selectively performing one of quashing said trained selected calls, handling said trapped selected calls without passing said trapped selected calls to said component instance, assisting said component instance in handling said trapped selected calls while passing said trapped selected calls to said component instance, and modifying said trapped selected calls before passing said trapped selected calls to said component instance.

3. The method of claim 2, wherein said creating a component instance comprises the step of instructing a factory object coupled to said dynamic proxy object definition to create said component instance.

4. The method of claim 2, further comprising the steps of:

determining whether an event notification service responsible for said distributing a notification has been activated; and, performing said routing a reference only if said event notification service has been activated.

5. The method of claim 2, wherein said routing a reference comprises the steps of:

consulting an event list enumerating specific ones of said trapped selected calls; and, posting to said event queue only specific ones of said calls included in said event list.

* * * * *